(12) United States Patent
Dongare et al.

(10) Patent No.: US 12,024,173 B2
(45) Date of Patent: Jul. 2, 2024

(54) SYSTEM AND METHOD FOR WORK STATE ESTIMATION AND CONTROL OF SELF-PROPELLED WORK VEHICLES

(71) Applicant: Deere & Company, Moline, IL (US)

(72) Inventors: Dipankar D. Dongare, Dombivali (IN); Dnyaneshwar Jagtap, Walchandnagar (IN); Rushikesh Jadhav, Parbhani (IN); Lance R. Sherlock, Asbury, IA (US); Mahesh Sorate, Baramati (IN); Sanket Pawar, Pune (IN); Vaibhav Bhutad, Paratwada (IN)

(73) Assignee: Deere & Company, Moline, IL (US)

( * ) Notice: Subject to any disclaimer, the term of this patent is extended or adjusted under 35 U.S.C. 154(b) by 261 days.

(21) Appl. No.: 17/143,219

(22) Filed: Jan. 7, 2021

(65) Prior Publication Data

US 2022/0135036 A1 May 5, 2022

(30) Foreign Application Priority Data

Nov. 4, 2020 (IN) .............................. 202021048194

(51) Int. Cl.
*B60W 30/182* (2020.01)
*E02F 3/43* (2006.01)
(Continued)

(52) U.S. Cl.
CPC ........... *B60W 30/182* (2013.01); *E02F 3/437* (2013.01); *E02F 9/028* (2013.01); *E02F 9/265* (2013.01);
(Continued)

(58) Field of Classification Search
CPC ....... A01G 2/00–33/00; B60W 30/182; B60W 2300/17; E02F 1/00–9/2891;
(Continued)

(56) References Cited

U.S. PATENT DOCUMENTS 5,493,798 A   2/1996   Rocke et al.
6,247,538 B1  6/2001   Takeda et al.
(Continued)

FOREIGN PATENT DOCUMENTS

JP   2018145925 A   9/2018
WO   2012157381 A1  11/2012

OTHER PUBLICATIONS

Extended European Search Report and Written Opinion issued in European Patent Application No. 21202273.5, dated Mar. 28, 2022, in 07 pages.

*Primary Examiner* — Mohamed Abdo Algehaim
(74) *Attorney, Agent, or Firm* — Gary L. Montle; Lucian Wayne Beavers; Patterson Intellectual Property Law, PC

(57) ABSTRACT

A self-propelled work vehicle is provided with work state estimation and associated control techniques. The work vehicle comprises ground engaging units, a work implement configured for controllably working terrain, and various onboard sensors. A controller is functionally linked to at least the one or more onboard sensors and configured to ascertain a first parameter or operation of the work vehicle, determine a work state of the work vehicle, based at least in part on respective input signals from one or more onboard sensors, and generate a control signal for controlling at least a second parameter or operation of the work vehicle, responsive to the ascertained first parameter or operation and the determined work state. The control signals may be provided for proactive adjustments to engine speed, movements of the work implement, movements of the work vehicle itself, etc.

18 Claims, 8 Drawing Sheets

(51) Int. Cl.
*E02F 9/02* (2006.01)
*E02F 9/26* (2006.01)
*G06F 18/24* (2023.01)
*G06V 20/56* (2022.01)

(52) U.S. Cl.
CPC .............. *G06F 18/24* (2023.01); *G06V 20/56* (2022.01); *B60W 2300/17* (2013.01)

(58) Field of Classification Search
CPC .... G06K 9/6267; G06K 9/6271; G06V 20/56; G06F 18/24; G06F 18/24133
USPC ........................................................... 701/70
See application file for complete search history.

(56) References Cited

U.S. PATENT DOCUMENTS

| | | | | |
|---|---|---|---|---|
| 7,664,586 | B2* | 2/2010 | Ozawa | F02D 41/2422 |
| | | | | 318/434 |
| 7,934,329 | B2 | 5/2011 | Mintah et al. | |
| 8,600,627 | B2* | 12/2013 | Beck | G07C 5/0808 |
| | | | | 701/34.2 |
| 9,074,546 | B2 | 7/2015 | Asami et al. | |
| 9,187,879 | B2 | 11/2015 | Suk | |
| 9,347,389 | B2 | 5/2016 | Kawaguchi et al. | |
| 9,376,116 | B1* | 6/2016 | Ge | F16F 15/02 |
| 2009/0218112 | A1* | 9/2009 | Mintah | E02F 3/437 |
| | | | | 701/50 |
| 2010/0017074 | A1* | 1/2010 | Verkuilen | E02F 9/265 |
| | | | | 701/50 |
| 2010/0100338 | A1* | 4/2010 | Vik | E02F 9/267 |
| | | | | 702/42 |
| 2012/0173005 | A1* | 7/2012 | Peterson | F02D 41/0215 |
| | | | | 700/44 |
| 2013/0041561 | A1* | 2/2013 | Asami | E02F 9/225 |
| | | | | 701/50 |
| 2014/0067092 | A1* | 3/2014 | Cesur | G05B 15/02 |
| | | | | 700/83 |
| 2014/0163779 | A1* | 6/2014 | Braunstein | E02F 9/2054 |
| | | | | 701/25 |
| 2015/0240453 | A1* | 8/2015 | Jaliwala | G01S 19/14 |
| | | | | 701/50 |
| 2015/0361640 | A1* | 12/2015 | Faivre | E02F 3/436 |
| | | | | 701/50 |
| 2016/0003171 | A1* | 1/2016 | Ge | E02F 9/267 |
| | | | | 701/102 |
| 2016/0017574 | A1* | 1/2016 | Adachi | E02F 9/2054 |
| | | | | 701/31.4 |
| 2016/0258128 | A1* | 9/2016 | Nakamura | E02F 9/2029 |
| 2016/0265186 | A1* | 9/2016 | Kami | E02F 9/262 |
| 2016/0273196 | A1* | 9/2016 | Funk | E02F 3/432 |
| 2016/0348653 | A1* | 12/2016 | Ge | E02F 9/2217 |
| 2017/0298592 | A1* | 10/2017 | Akanda | E02F 3/304 |
| 2018/0174291 | A1* | 6/2018 | Asada | G06T 7/0004 |
| 2019/0127947 | A1* | 5/2019 | Zent | E02F 9/2221 |
| 2019/0301144 | A1* | 10/2019 | Kean | E02F 9/265 |
| 2019/0330823 | A1* | 10/2019 | Kean | G05B 15/02 |
| 2020/0042023 | A1 | 2/2020 | Garvin et al. | |
| 2020/0048861 | A1* | 2/2020 | Narikawa | E02F 3/439 |
| 2020/0050890 | A1* | 2/2020 | Aizawa | G06V 20/20 |
| 2020/0224383 | A1* | 7/2020 | Ishida | E02F 3/435 |
| 2020/0270848 | A1* | 8/2020 | Knowles | E02F 9/265 |
| 2020/0299933 | A1* | 9/2020 | Wu | E02F 9/265 |
| 2020/0362889 | A1* | 11/2020 | Hodel | E02F 9/2267 |
| 2020/0392696 | A1* | 12/2020 | Zuo | E02F 3/844 |
| 2021/0025141 | A1* | 1/2021 | Hamada | G06N 20/00 |
| 2021/0040713 | A1* | 2/2021 | Yamanaka | E02F 9/264 |
| 2021/0072727 | A1* | 3/2021 | Stanger | E02F 9/262 |
| 2021/0148085 | A1* | 5/2021 | Kim | E02F 9/265 |
| 2022/0307226 | A1* | 9/2022 | Aratame | E02F 3/431 |

* cited by examiner

SYSTEM AND METHOD FOR WORK STATE ESTIMATION AND CONTROL OF SELF-PROPELLED WORK VEHICLES

FIELD OF THE DISCLOSURE

The present disclosure relates generally to self-propelled work vehicles such as construction and forestry machines, and more particularly to systems and methods for work state estimation and control of certain operations of such self-propelled work vehicles.

BACKGROUND

Self-propelled work vehicles of this type may for example include excavator machines, forestry machines, front shovel machines, and others. These machines may typically have tracked ground engaging units supporting the undercarriage from the ground surface.

Various situations arise with such machines where the human operator needs to perform repetitive operations (e.g., dig and dump, log pick and unload). These operations often require coordinated positioning of one or more work tools at the same location. Referring to an exemplary operation of an excavator, after a digging step the operator may provide a command to curl the tool (bucket), after which simultaneous commands are provided to move the boom upwards, move the arm inwards, and laterally swing the assembly.

Another common situation for such tracked work vehicles includes the use of engine speed dials or equivalent interface tools 116 to set engine speeds, based for example on the type of operation being performed by the work vehicle, and frequently further based on operator preference. During field operations, operators may typically set these engine speeds dials on their high idle (i.e., maximum) set point settings, irrespective of the work being done and the load on self-propelled work vehicle, rather than continuously adjusting the engine speed manually. This understandably produces substantial waste of fuel and reduced productivity.

It would be desirable to automate certain of the aforementioned coordinated operations based on the type of work being performed and/or detected work conditions or parameters, such as work demand (load), thereby increasing productivity and ease of operating the work vehicle, and further reducing operator fatigue from the repetitive operations.

BRIEF SUMMARY

The current disclosure provides an enhancement to conventional systems, at least in part by introducing a novel system and method for estimating at least the work state of a self-propelled work vehicle at a given time, and accordingly implementing automation of certain vehicle operations and associated functions.

In one embodiment, a computer-implemented method as disclosed herein is provided for controlling one or more aspects of a self-propelled work vehicle comprising a plurality of ground engaging units and at least one work implement configured for controllably working terrain. One or more operator commands are received regarding at least a first parameter or operation of the self-propelled work vehicle. A work state of the self-propelled work vehicle is automatically determined, based at least in part on respective input signals from one or more onboard sensors, and a control signal is generated for controlling at least a second parameter or operation of the self-propelled work vehicle, responsive to the one or more operator commands and the determined work state.

In an exemplary aspect of the above-referenced embodiment, the determining of a work state of the self-propelled work vehicle comprises classifying sequences of data from one or more onboard sensors into different predetermined work states, receiving input signals from at least one of the one or more onboard sensors, and predicting the work state based a comparison of the received input signals to the classified sequences of data.

In another exemplary aspect of the above-referenced embodiment, the method further comprises, for a particular predicted work state, determining a current parameter or operation based on input signals from at least one of the one or more onboard sensors, predicting a next parameter or operation corresponding to the predicted work state and the determined current parameter or operation, and generating the control signal for controlling at least the second parameter or operation of the self-propelled work vehicle based on the predicted next parameter or operation.

In another exemplary aspect of the above-referenced embodiment, the determining of a work state of the self-propelled work vehicle comprises classifying sequences of operator commands and data from one or more onboard sensors into different predetermined work states, receiving a sequence comprising at least one operator command and at least one input signal from an onboard sensors, and predicting the work state based a comparison of the received sequence to the classified sequences of operator commands and data.

In another exemplary aspect of the above-referenced embodiment, the generated control signal is configured to control movements of at least one work implement, based on a detected position of the at least one work implement and further responsive to the one or more operator commands and the determined work state.

In another exemplary aspect of the above-referenced embodiment, the one or more operator commands relate to at least swing operation commands regarding the at least one work implement, and control signals are generated for controlling movements of at least a boom and an arm associated with the swing operation, further responsive to the determined work state In another exemplary aspect of the above-referenced embodiment, the generated control signal is configured to control movements of the self-propelled work vehicle via the one or more ground engaging units, based on a detected position and/or orientation of at least one portion of the self-propelled work vehicle and further responsive to the one or more operator commands and the determined work state.

In another exemplary aspect of the above-referenced embodiment, at least one of the one or more onboard sensors is configured to generate signals representing a work load, and the generated control signal is configured to control an engine speed of the self-propelled work vehicle, responsive to the one or more operator commands, the determined work state, and a determined work load.

In another exemplary aspect of the above-referenced embodiment, the input signals from at least one of the one or more onboard sensors are representative of one or more of: a movement sequence for at least one of the one or more work implements; a location of the self-propelled work vehicle; and a plane of a ground surface upon which the self-propelled work vehicle is supported.

In another exemplary aspect of the above-referenced embodiment, the operator commands are received via at least one of the one or more onboard sensors.

In another exemplary aspect of the above-referenced embodiment, the operator commands are received via a user interface associated with an onboard computing device.

In another exemplary aspect of the above-referenced embodiment, one or more further operator commands via the user interface selectively enable or disable the generated control signal for controlling at least the second parameter or operation of the self-propelled work vehicle.

In another embodiment as disclosed herein, a self-propelled work vehicle is provided with a plurality of ground engaging units, at least one work implement configured for controllably working terrain, one or more onboard sensors, and a controller functionally linked to at least the one or more onboard sensors and the user interface. The controller is further configured to perform a method according to the above-referenced embodiment and optionally any of the associated aspects.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-9, various embodiments may now be described of a system and method for automated work state estimation and associated control techniques.

Figure 1:
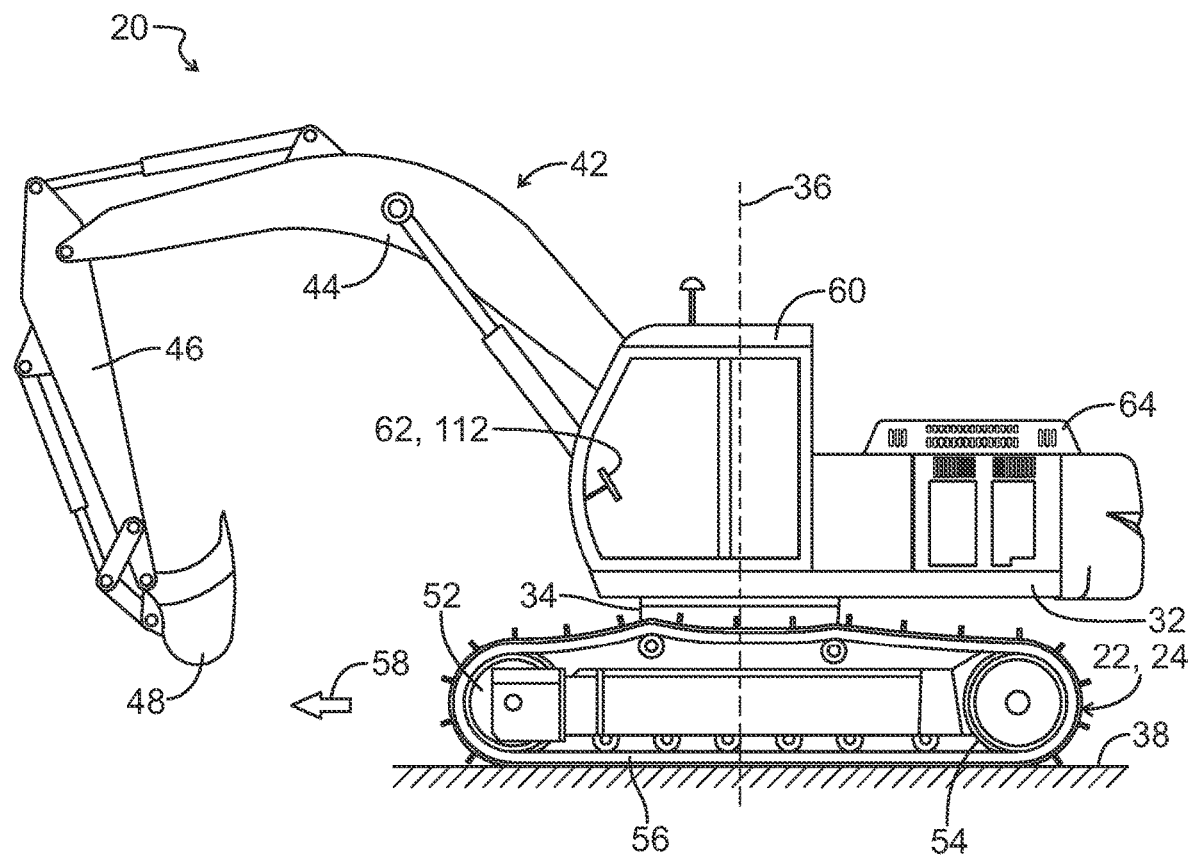
FIG. 1 is a side view representing an excavator as an exemplary self-propelled work vehicle according to the present disclosure.

FIG. 1 in a particular embodiment as disclosed herein shows a representative self-propelled work vehicle in the form of, for example, a tracked excavator machine 20. The working machine 20 includes an undercarriage 22 including first and second ground engaging units 24 including first and second travel motors (not shown) for driving the first and second ground engaging units 24, respectively.

A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

A work implement 42 in the context of the referenced work vehicle 20 includes a boom assembly 42 with a boom 44, an arm 46 pivotally connected to the boom 44, and a working tool 48. The boom 44 is pivotally attached to the main frame 32 to pivot about a generally horizontal axis relative to the main frame 32. The working tool in this embodiment is an excavator shovel 48 which is pivotally connected to the arm 46. The boom assembly 42 extends from the main frame 32 along a working direction of the boom assembly 42. The working direction can also be described as a working direction of the boom 44. As described herein, control of the work implement 42 may relate to control of any one or more of the associated components (e.g., boom 44, arm 46, tool 48).

In the embodiment of FIG. 1, the first and second ground engaging units 24 are tracked ground engaging units. Each of the tracked ground engaging units 24 includes a front idler 52, a drive sprocket 54, and a track chain 56 extending around the front idler 52 and the drive sprocket 54. The travel motor of each tracked ground engaging unit 24 drives its respective drive sprocket 54. Each tracked ground engaging unit 24 has a forward traveling direction 58 defined from the drive sprocket 54 toward the front idler 52. The forward traveling direction 58 of the tracked ground engaging units 24 also defines a forward traveling direction 58 of the undercarriage 22 and thus of the working machine 20.

An operator's cab 60 may be located on the main frame 32. The operator's cab 60 and the boom assembly 42 may both be mounted on the main frame 32 so that the operator's cab 60 faces in the working direction 58 of the boom assembly. A control station 62 may be located in the operator's cab 60.

Also mounted on the main frame 32 is an engine 64 for powering the working machine 20. The engine 64 may be a diesel internal combustion engine. The engine 64 may drive a hydraulic pump to provide hydraulic power to the various operating systems of the working machine 20.

Figure 3:
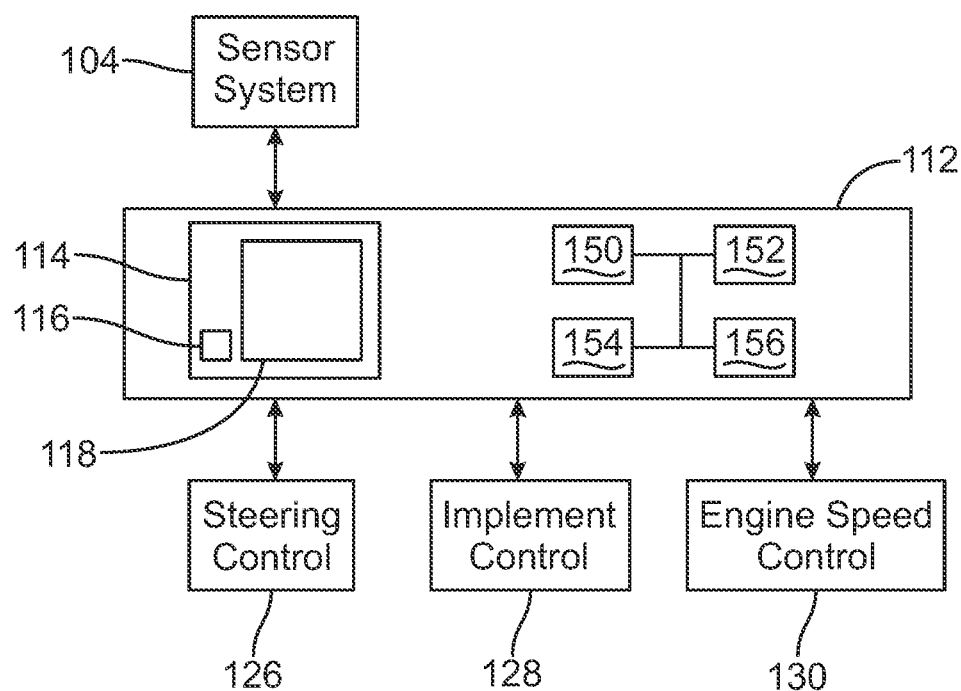
FIG. 3 is a block diagram representing an exemplary control system according to an embodiment of the present disclosure.

As schematically illustrated in FIG. 3, the self-propelled work vehicle 20 includes a control system including a controller 112. The controller may be part of the machine control system of the working machine, or it may be a separate control module. The controller 112 may include a user interface 114 and optionally be mounted in the operator's cab 60 at the control station 62.

The controller 112 is configured to receive input signals from some or all of various sensors collectively defining a sensor system 104, individual examples of which may be described below. Various sensors on the sensor system 104 may typically be discrete in nature, but signals representative of more than one input parameter may be provided from the same sensor, and the sensor system 104 may further refer to signals provided from the machine control system.

The controller 112 may be configured to produce outputs, as further described below, to the user interface 114 for display to the human operator. The controller 112 may further or in the alternative be configured to generate control signals for controlling the operation of respective actuators, or signals for indirect control via intermediate control units, associated with a machine steering control system 126, a machine implement control system 128, and an engine speed control system 130. The controller 112 may for example generate control signals for controlling the operation of various actuators, such as hydraulic motors or hydraulic piston-cylinder units 124, and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112.

The controller 112 includes or may be associated with a processor 150, a computer readable medium 152, a communication unit 154, data storage 156 such as for example a database network, and the aforementioned user interface 114 or control panel 114 having a display 118. An input/output device 116, such as a keyboard, joystick or other user interface tool 116, is provided so that the human operator may input instructions to the controller. It is understood that the controller 112 described herein may be a single controller having all of the described functionality, or it may include multiple controllers wherein the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium 152 can be coupled to the processor 150 such that the processor 150 can read information from, and write information to, the memory/storage medium 152. In the alternative, the medium 152 can be integral to the processor 150. The processor 150 and the medium 152 can reside in an application specific integrated circuit (ASIC). The ASIC can reside in a user terminal. In the alternative, the processor 150 and the medium 152 can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor 150 can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller 112 and external systems or devices, and/or support or provide communication interface with respect to internal components of the self-propelled work vehicle 20, 120. The communications unit may include wireless communication system components (e.g., via cellular modem, WiFi, Bluetooth or the like) and/or may include one or more wired communications terminals such as universal serial bus ports.

The data storage 156 as further described below may, unless otherwise stated, generally encompass hardware such as volatile or non-volatile storage devices, drives, memory, or other storage media, as well as one or more databases residing thereon.

Figure 2:
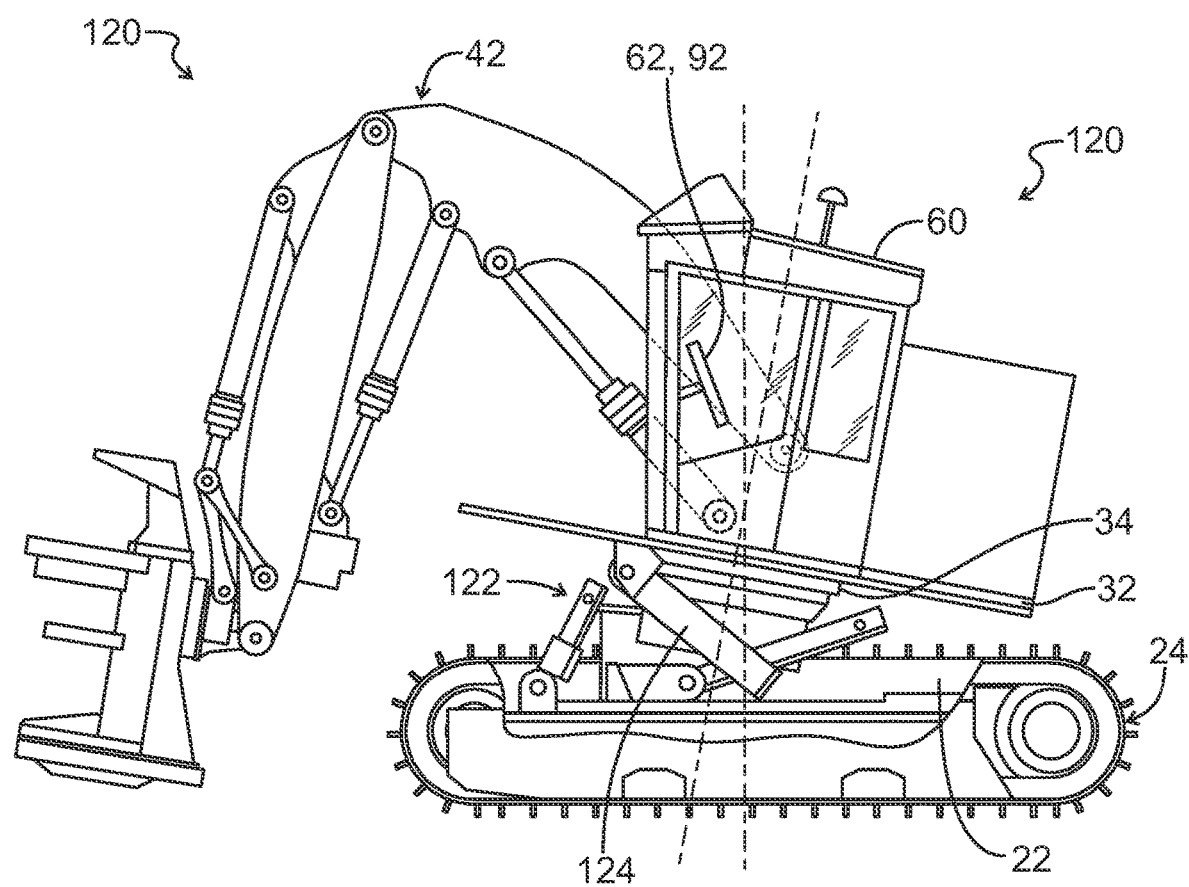
FIG. 2 is a side view representing a forestry machine as an exemplary self-propelled work vehicle according to the present disclosure.

Referring to FIG. 2, another embodiment of such a self-propelled work vehicle is embodied as a tracked forestry machine 120 such as a feller buncher for the harvesting of trees. Similar to the excavator type of work vehicle 20 previously described, the tracked forestry machine 120 has an undercarriage 22, first and second tracked ground engaging units 24, main frame 32, swing bearing 34, and boom assembly 42. The forestry machine 120 may include the same control system as described with regard to FIG. 3 to control the orientation of its undercarriage 22 relative to the ground surface 38, and to control the orientation of its main frame 32 and boom assembly 42 relative to its undercarriage 22.

The forestry machine 120 may often be operated on very uneven ground such as when harvesting trees in a mountainous area. Accordingly the forestry machine 120 may include a leveling mechanism 122 including a plurality of linear actuators which may be in the form of hydraulic piston-cylinder units 124 to adjust a pitch and roll of the swing bearing 34 and thus the main frame 32 relative to the undercarriage 22. In the case of the forestry machine 120 the pivotal axis 36 is defined by the swing bearing 34 and a pivot angle sensor (not shown) may be mounted between upper and lower rings (not shown) of the swing bearing 34.

Figure 4:
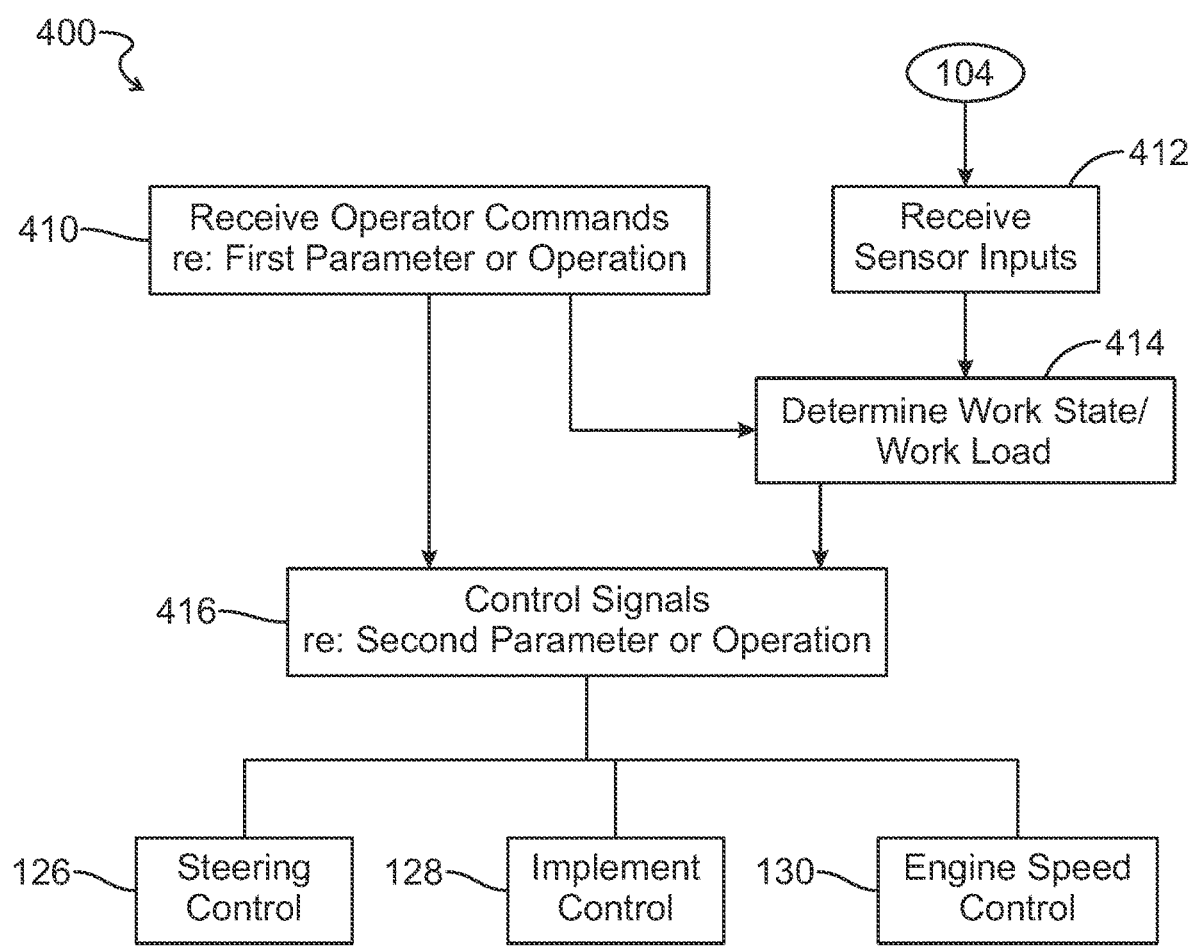
FIG. 4 is a flowchart representing an exemplary method according to an embodiment of the present disclosure.

Referring next to FIG. 4, an exemplary and high-level method 400 may now be described, followed by more particular examples of methods as disclosed herein and with further reference to FIGS. 5-9.

The method 400 includes receiving operator commands, via for example the user interface 114, regarding at least a first parameter or operation, or a first sequence of parameters or operations (step 410). One or more sensor inputs are received (step 412) from respective sources in the sensor system 104 are further processed along with the operator commands to ascertain a work state and/or work load (step 414) for the self-propelled work vehicle 20, 120. The ascertained work state and/or work load, along with the received operator commands, are further processed to generate control signals (step 416) regarding at least a second parameter or operation (or sequence of parameters or operations) for automation in conjunction with the first parameter or operation (or sequence of parameters or operations). The control signals may be provided to any one or more of the steering control system 126, the implement control system 128, and the engine speed control system 130 depending on the relevant application.

Figure 5:
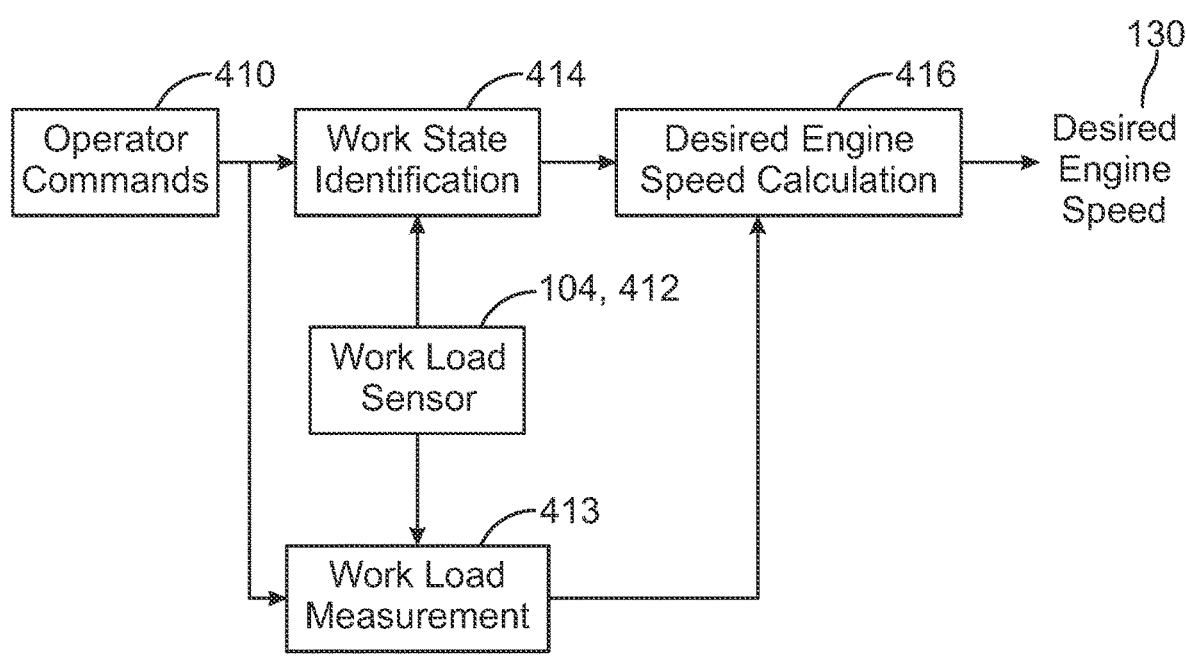
FIG. 5 is a flowchart representing an exemplary method according to another embodiment of the present disclosure.

FIG. 5 relates to an embodiment of the method 400 wherein a desired engine speed is calculated in step 416 and implemented for automated engine speed control (via e.g. the engine speed control system 130) based on work state and work load determinations in step 414. In self-propelled construction work vehicles 20, such as excavators, the work load measurement 413 may be provided via work load inputs 412 from a payload weighing system 104$j$ of the sensor system 104. In self-propelled forestry vehicles 120, such as feller bunchers, the work load may refer to log weight, and work load measurement 413 may for example be provided via work load inputs 412 from a head pressure sensor 104$a$.

Figure 6:
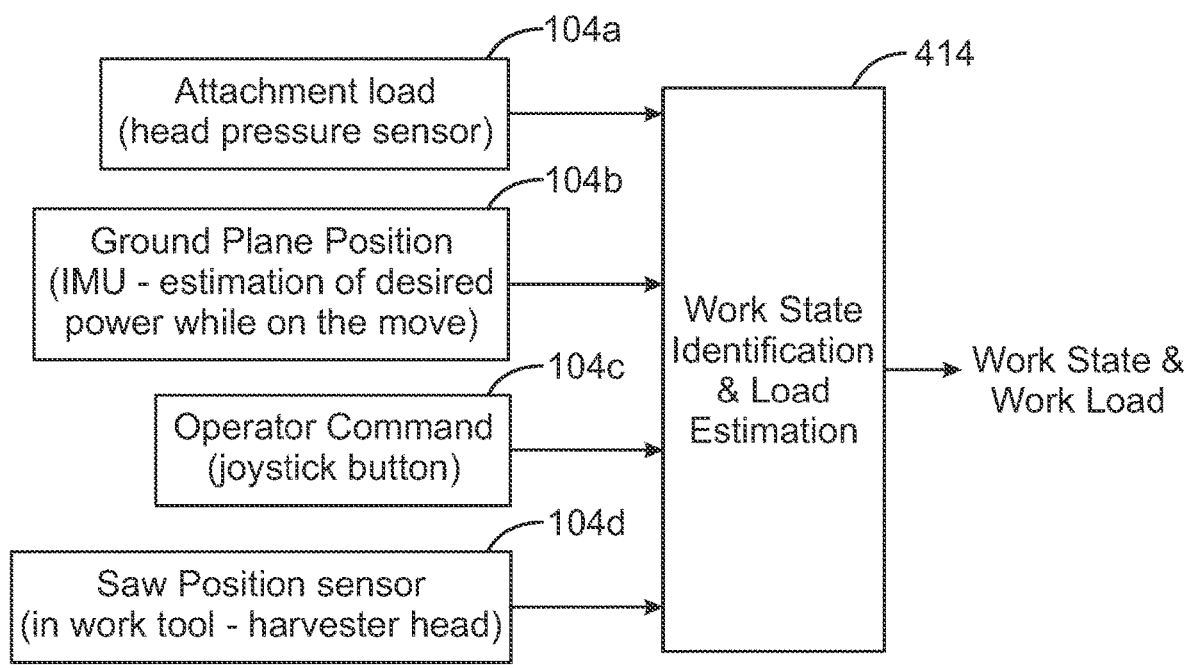
FIG. 6 is a flowchart representing an exemplary method according to another embodiment of the present disclosure.

As represented in FIG. 6, the work state identification 414 in a forestry work vehicle 120 may be performed in some embodiments through direct implementation of vehicle sensors 104 including, e.g., the head pressure sensor 104$a$ to detect attachment load, a ground plane position sensor 104$b$ such as an inertial measurement unit (IMU) for estimating desired power while on the move, operator commands 104$c$ received via a joystick button 116 or equivalent input/output device 116 for receiving operator commands 410 via the user interface 114, a saw position sensor 104$d$ in the work tool 48 such as the harvester head, etc.

Figure 7:
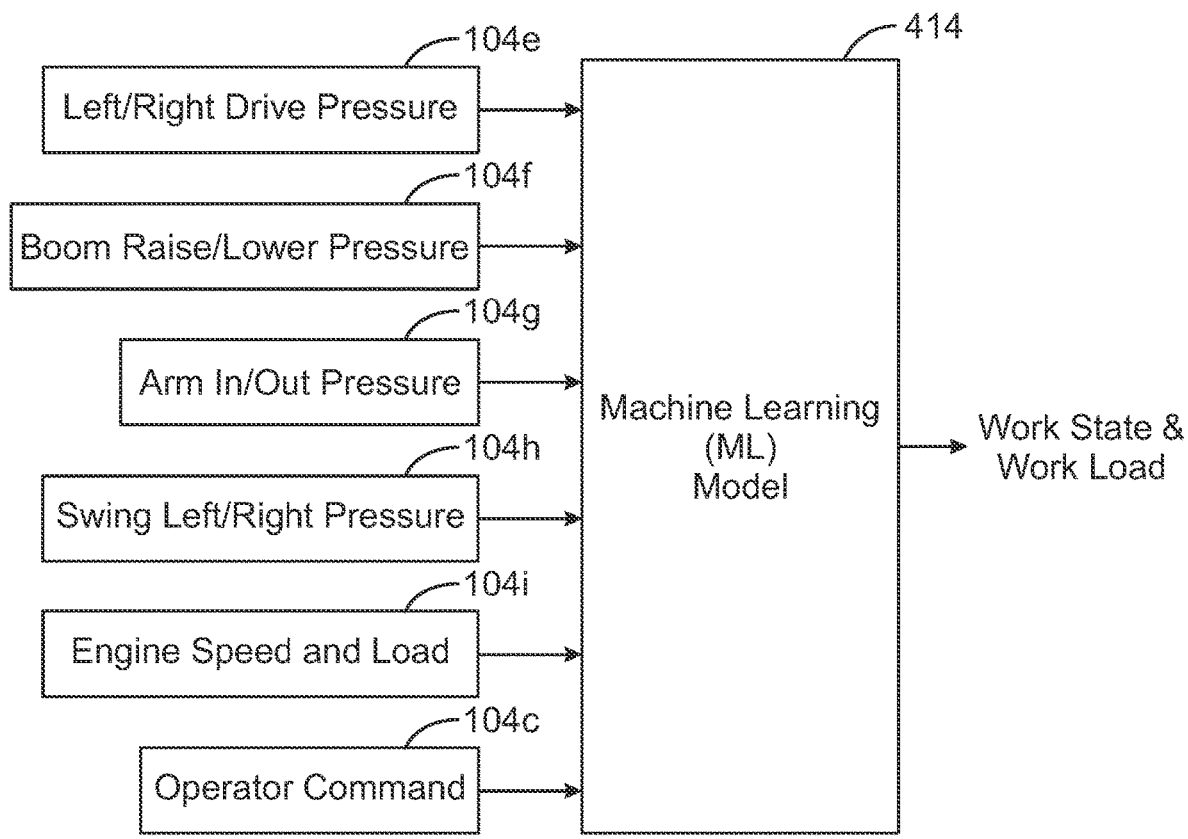
FIG. 7 is a flowchart representing an exemplary method according to another embodiment of the present disclosure.

As represented in FIG. 7, where for example some of the aforementioned sensors are unavailable or otherwise preferably not implemented for a given application, the work state identification 414 may be provided using onboard machine learning algorithms. Using the excavator work vehicle 20 as an example, training inputs may be provided to the machine learning model corresponding to time series data values for one or more of: left/right drive pressure 104e; boom raise/lower pressure 104f; arm in/out pressure 104g; swing left/right pressure 104h; engine speed and load 104i; and operator commands 104c, wherein the model is further verified over time using test data inputs which may relate to the same or analogous sources.

Generally stated, work state estimation as disclosed herein may encompass the classifying of sequences of data recorded by sensors into defined machine states. For the excavator work vehicle 20, an exemplary sequence of work states may include Dig, Swing, Dump, Adjust to Dump, and Travel. Work state estimation may be treated a classical sequence classification problem, addressed in an embodiment as disclosed herein by building supervised Machine Learning (ML)/Deep Learning (DL) classification algorithms like Logistic Regression and Long Short-Term Memory (LSTM) recurrent neural network models for sequence classification. The LSTM models are capable of learning from internal representations of the time series data, effectively remembering over long sequences of input data and previous operation of the self-propelled work vehicle 20, 120. The LSTM models may accordingly be trained on time series data (exemplary inputs as noted above) and observe loss and accuracy values over N training iterations, wherein losses are decreased and accuracy increased over time. The model may be described as classifying these time series data into defined work states.

For generation of the model, the time series data may for example be streamed from the respective sensors/data sources 104, 410, 412 on a work vehicle 20, 120 (or a plurality of analogous work vehicles) via a communications network onto a cloud server network, wherein the model is developed (i.e., trained and validated) at the cloud server level. Once the model has been sufficiently validated, it may be transmitted, for example via the communications network, and deployed by the controller 112 onboard a work vehicle 20, 120 for subsequent work state estimation and work load estimation. The cloud server network may however continue to receive input time series data from the work vehicle 20, 120 (or plurality of analogous work vehicles) for the purpose of further refining the model, wherein updated versions of the model may be transmitted to the work vehicle 20, 120 periodically or on demand.

In an embodiment, the controller 112 implementing a work state estimation model as disclosed herein may be configured to distinguish various causes of detected loading based on operations of the work vehicle and components thereof, each operation having, e.g., a corresponding maximum power (pressure/flow) requirement based on past data and/or work tool specifications, and accordingly calculating a target engine speed correlating to a reference engine speed for the defined work state and further based on a sensed load, predetermined weight factors, minimum and/or maximum engine speed settings, and the like.

For example, a forestry work vehicle 120 may be associated with causes of loading including (but not limited to) a boom operation, a head operation, and a transmission operation. These causes of loading may be respectively correlated with sensor inputs corresponding to operations including but not limited to: (a) Grab/Hold Stem; (b) Lift; (c) Grab and Left Stem; (d) Dump Stem; (e) Lift and Move; (f) Travel without Load (potentially distinguishing between flat and sloped terrain); (g) Travel with Load; (h) Travel While Handling Stem; (i) Stem Cut; and (j) Stem Cut with Grapple Pressure (for example improve the hold on the stem). For example, a first cause of loading (boom operation) may be correlated with the aforementioned operations: (b), (c), (e), (f), and/or (h). As another example, a second cause of loading (head operation) may be correlated with the aforementioned operations: (a), (c), (d), (g), (h), (i), and/or (j). As yet another example, a third cause of loading (transmission operation) may be correlated with the aforementioned operations: (e), (g), and/or (h).

The embodiments as previously described have been in the context of engine speed control 130 based on work state estimation and work load estimation. In other embodiments, work state estimation and work load estimation may also (or in the alternative) be implemented for implement and/or steering control functions via the implement control system 128 and/or steering control system 126, respectively.

In the context of an excavator work vehicle 20, an exemplary operation cycle may be divided into four segments: excavation of the material at an excavation point; travel from the excavation point to a dumping point; dumping of the material at the dumping point; and traveling from the dumping point back to the excavation point. It may be noted that the excavator 20 is merely discussed herein as illustrative, and numerous other self-propelled work vehicles may perform similar operations such as knuckle-boom loaders, tracked feller bunchers, swing machine log loaders, forwarders, and the like. Of the aforementioned segments, the actual excavation of material and the dumping of material may be considered as optimally performed by the operator, but the traveling functions may comprise repetitive movements of implement components (e.g., a bucket, tilted bucket, grapple, etc.), which may be optimally automated during the excavation process.

Accordingly, in an embodiment as disclosed herein, work implement positioning is automated by the controller 112 based upon estimated work state and detected work implement positions, wherein a first movement or sequence of movements (e.g., corresponding to the swing of the boom) are controlled directly by the operator and used as a trigger for automatic control of a second movement of sequence of movements (e.g., the work implement positioning).

The user interface 114 may be configured for enabling the automated control functions via a button or equivalent on/off actuator. The user interface 114 may further be configured for enabling the operator to override the automated control functions, or alternatively such an override may be implemented by the operator simply carrying out the functions manually according to the conventional techniques, such as for example manual boom 44 or arm 46 commands using the relevant joysticks.

Figure 8:
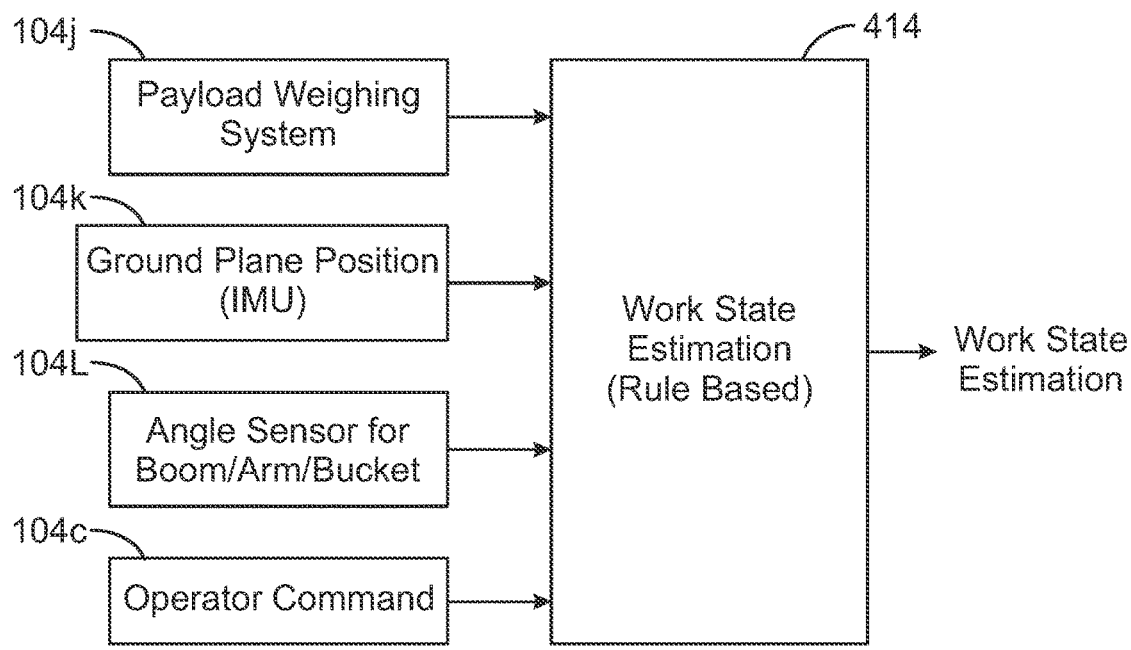
FIG. 8 is a flowchart representing an exemplary method according to another embodiment of the present disclosure.

Referring to FIG. 8, rules-based work state estimation 414 for the excavator work vehicle 20 may be provided, with exemplary inputs in this context provided from a payload weighing system 104j, a ground plane position sensor (e.g., IMU) 104k, an angle sensor 104L for one or more of the boom 44, the arm 46, and the work tool 48 (e.g., bucket), and inputs from the user interface 114 corresponding to operator commands 104c.

Figure 9:
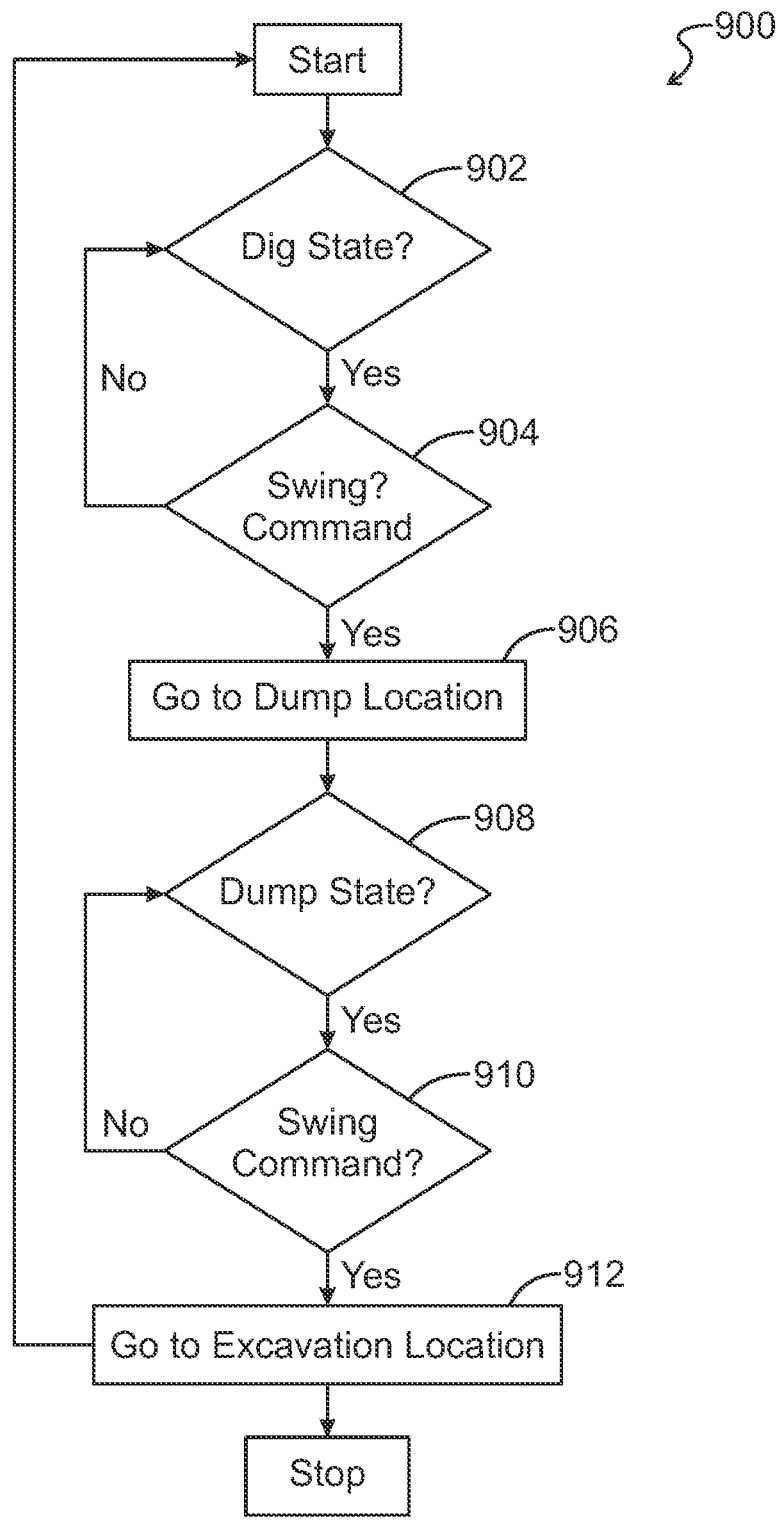
FIG. 9 is a flowchart representing an exemplary method according to another embodiment of the present disclosure.

Referring next to FIG. 9, an exemplary process 900 for excavation automation using work state estimation may be described. Initially, the automated process may optionally be enabled as described above using an operator command. In an embodiment, a first cycle of the method may include recording of an excavation location and a dump location based on work state identification. Even after the initial recording/recognition cycle, as previously noted, the actual process of dumping material may optimally be left to the operator, such that the system merely processes input data and operator commands and accordingly identifies a Digging work state (step 902), after which a received operator command corresponding to a Swing to Dump work state (step 904) triggers the system for automated control of the boom 44 and of the arm 46 to the recorded dumping location (step 906). The Digging work state may for example be ascertained based on inputs from a payload weighing system 104*j* corresponding with a load, from a pressure sensor associated with the arm 46, boom 44, and/or working tool 48, and further based on implement component positions (via IMU 104*k* and/or angle sensors 104L). The Swing to Dump work state may for example be ascertained based on an operator swing command with a detected load, and inputs from a swing motor pressure sensor and further based on the implement component positions (via IMU 104*k* and/or angle sensors 104L).

Again as previously noted, the actual step of dumping may also optimally be left to the operator, such that the system merely processes input data and operator commands and accordingly identifies a Dumping work state (step 908), after which a received operator Swing to Dig command (step 910) triggers the system for automated control of the boom 44 and of the arm 46 to the recorded excavation location (step 912). The Dumping work state may for example be ascertained based on inputs from a payload weighing system 104*j* corresponding with no load, from a pressure sensor associated with the arm 46, boom 44, and/or working too 48, and further based on implement component positions (via IMU 104*k* and/or angle sensors 104L). The Swing to Dig work state may for example be ascertained based on an operator swing command without a detected load, and inputs from a swing motor pressure sensor and further based on the implement component positions (via IMU 104*k* and/or angle sensors 104L).

In various alternative embodiments as may be appreciated by one of skill in the art, the above-referenced work state estimation and control principles may be applied for other self-propelled work vehicle applications, including for example those requiring control over repetitive movements of the self-propelled work vehicle itself, wherein steering control systems 126 may be implemented in addition to, or instead of, the implement movement control 128 and/or engine speed control 130 embodiments as otherwise described in more detail herein.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of controlling one or more aspects of a self-propelled work vehicle comprising a plurality of ground engaging units and at least one work implement configured for controllably working terrain, the method comprising:
providing time series data from one or more onboard sensors and corresponding to sequences of one or more parameters or operations of the self-propelled work vehicle from the self-propelled work vehicle to a remote cloud server network as training inputs to a model at the remote cloud server network, wherein at least one of the one or more onboard sensors comprises a hydraulic pressure sensor associated with the work implement, and wherein upon validation of the model over a plurality of training iterations of the work vehicle, the model further classifies the provided time series data as the training inputs into different predetermined work states;
transmitting an updated version of the model from the remote cloud server network to the work vehicle;
receiving a combination of current time series data from the one or more onboard sensors and corresponding to at least a first parameter or operation of the self-propelled work vehicle;
determining a work state of the self-propelled work vehicle via the updated version of the model, based at least in part on a learned correlation between the received combination of current time series data with respect to the different predetermined work states; and
generating a control signal for controlling at least a second parameter or operation of the self-propelled work vehicle, responsive to at least the determined work state.

2. The method of claim 1, for a particular predicted work state comprising:
determining a current parameter or operation based on input signals from at least one of the one or more onboard sensors;
predicting a next parameter or operation corresponding to the predicted work state and the determined current parameter or operation; and
generating the control signal for controlling at least the second parameter or operation of the self-propelled work vehicle based on the predicted next parameter or operation.

3. The method of claim 1, wherein the generated control signal is configured to control movements of the at least one work implement, based on a detected position of the at least one work implement and further responsive to one or more operator commands and the determined work state.

4. The method of claim 3, wherein the one or more operator commands relate to at least swing operation commands regarding the at least one work implement, and control signals are generated for controlling movements of at least a boom and an arm associated with the swing operation, further responsive to the determined work state.

5. The method of claim 1, wherein the generated control signal is configured to control movements of the self-propelled work vehicle via at least one of the plurality of ground engaging units, based on a detected position and/or orientation of at least one portion of the self-propelled work vehicle and further responsive to one or more operator commands and the determined work state.

6. The method of claim 1, wherein:
at least one of the one or more onboard sensors is configured to generate signals representing a work load, and
the generated control signal is configured to control an engine speed of the self-propelled work vehicle, responsive to one or more operator commands, the determined work state, and a determined work load.

7. The method of claim 1, wherein input signals from at least one of the one or more onboard sensors are representative of one or more of:
a movement sequence for the at least one work implement;
a location of the self-propelled work vehicle; and
a plane of a ground surface upon which the self-propelled work vehicle is supported.

8. The method of claim 1, wherein operator commands are received via at least one of the one or more onboard sensors.

9. The method of claim 1, wherein operator commands are received via a user interface associated with an onboard computing device.

10. The method of claim 9, wherein one or more further operator commands via the user interface selectively enable or disable the generated control signal for controlling at least the second parameter or operation of the self-propelled work vehicle.

11. A self-propelled work vehicle comprising:
a plurality of ground engaging units;
at least one work implement configured for controllably working terrain;
one or more onboard sensors;
a user interface configured to enable user entry of operator commands regarding at least a first parameter or operation of the self-propelled work vehicle;
a controller functionally linked to at least the one or more onboard sensors and configured to
provide time series data from the one or more onboard sensors and corresponding to sequences of one or more parameters or operations of the self-propelled work vehicle from the self-propelled work vehicle to a remote cloud server network as training inputs to a model at the remote cloud server network, wherein at least one of the one or more onboard sensors comprises a hydraulic pressure sensor associated with the work implement;
and wherein upon validation of the model over a plurality of training iterations of the self-propelled work vehicle, the model further classifies the provided time series data as the training inputs into different predetermined work states,
receive an updated version of the model from the remote cloud server network,
receive a combination of current inputs comprising one or more of the operator commands regarding at least the first parameter or operation of the self-propelled work vehicle and/or input signals from at least one of the one or more onboard sensors,
determine a work state of the self-propelled work vehicle via the updated version of the model, based at least in part on a learned correlation between the received combination of current inputs with respect to the different predetermined work states, and
generate a control signal for controlling at least a second parameter or operation of the self-propelled work vehicle, responsive to the ascertained first parameter or operation and the determined work state.

12. The self-propelled work vehicle of claim 11, wherein the controller is configured for a particular predicted work state to:
determine a current parameter or operation based on input signals from at least one of the one or more onboard sensors;
predict a next parameter or operation corresponding to the predicted work state and the determined current parameter or operation; and
generate the control signal for controlling at least the second parameter or operation of the self-propelled work vehicle based on the predicted next parameter or operation.

13. The self-propelled work vehicle of claim 11, wherein the generated control signal is configured to control one or more of:
movements of the at least one work implement, based on a detected position of the at least one work implement and further responsive to one or more of the operator commands and the determined work state; and
movements of the self-propelled work vehicle via at least one or more of the plurality of ground engaging units, based on a detected position and/or orientation of at least one portion of the self-propelled work vehicle and further responsive to the one or more of the operator commands and the determined work state.

14. The self-propelled work vehicle of claim 11, wherein:
at least one of the one or more onboard sensors is configured to generate signals representing a work load, and
the generated control signal is configured to control an engine speed of the self-propelled work vehicle, responsive to one or more of the operator commands, the determined work state, and a determined work load.

15. The self-propelled work vehicle of claim 11, wherein the input signals from at least one of the one or more onboard sensors are representative of one or more of:
a movement sequence for the at least one work implement;
a location of the self-propelled work vehicle; and
a plane of a ground surface upon which the self-propelled work vehicle is supported.

16. The self-propelled work vehicle of claim 11, wherein the operator commands are received via at least one of the one or more onboard sensors.

17. The self-propelled work vehicle of claim 11, wherein the operator commands are received via a user interface associated with an onboard computing device.

18. The self-propelled work vehicle of claim 17, wherein one or more further operator commands via the user interface selectively enable or disable the generated control signal for controlling at least the second parameter or operation of the self-propelled work vehicle.

* * * * *